A. ZIMMERER.
Well-Bucket.

No. 214,342. Patented April 15, 1879.

Witnesses:
W. F. Morrell
A. N. Noyes

Inventor:
Anton Zimmerer
per attys.
A. H. Evans & Co.

UNITED STATES PATENT OFFICE.

ANTON ZIMMERER, OF NEBRASKA CITY, NEBRASKA.

IMPROVEMENT IN WELL-BUCKETS.

Specification forming part of Letters Patent No. 214,342, dated April 15, 1879; application filed March 8, 1879.

*To all whom it may concern:*

Be it known that I, ANTON ZIMMERER, of Nebraska City, county of Otoe, and State of Nebraska, have invented certain Improvements in Well-Buckets; and I hereby declare the following to be a full, clear, and exact description thereof, reference being had to the accompanying drawings, making part of this specification, and in which—

Figure 1:
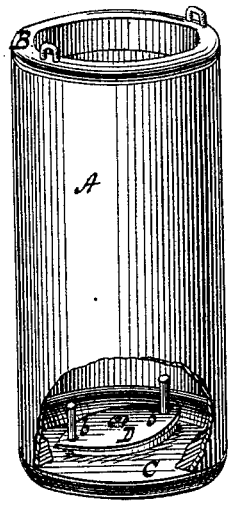
Figure 2:
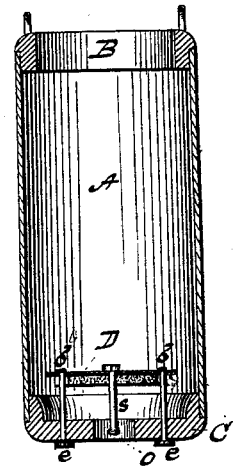

Figure 1 is a view of the bucket with a portion cut away. Fig. 2 is a vertical sectional view.

My invention pertains to buckets for wells; and the object of my invention is to provide a bucket of great durability and certainty of valve action; and it consists of certain details of construction, as hereinafter set forth and claimed.

In order that those skilled in the art may make and use my invention, I will proceed to describe the exact manner in which I have carried it out.

In the said drawings, A is a sheet-metal cylinder, having at one end an interior cast-metal annulus or ring, B, which forms a strengthening and sustaining rib, and on which are cast the ears to receive the bail of the bucket.

The bottom of the bucket is made of a stout circular metal casting, C, having an opening, $o$, in its center, for the ingress and egress of the water or other liquid that may be drawn. Two bolts, $b\ b$, pass through the casting C, and have their heads and stems projecting within the bucket, and the nuts $e\ e$ on the outside.

Inside the bucket, over the opening $o$, is a valve, D, which works up and down on bolts $b\ b$ as guides, and which closes to retain the water as the bucket is lifted. From the center of valve D a stem, $s$, projects through opening $o$ and beyond the lower surface of the cast bottom. When the bucket reaches any obstruction in the well, the stem $s$ forces the valve up, so as to allow the water or other liquid to enter the bucket freely.

When the bucket is being elevated the valve drops by gravity, and the weight of the liquid keeps the valve-packing close to the casting, and the liquid is retained.

When the bucket is set into a tub or other vessel to receive the liquid, the stem thrusts the valve upward, the bucket rests on nuts $e\ e$, and the liquid escapes through opening $o$.

Having thus described my invention, what I claim as new, and desire to secure by Letters Patent, is—

A well-bucket having a sheet-metal body, A, inserted ring B, cast with ears $a\ a$, bottom casting, C, provided with opening $o$, bolts $b\ b$, having nuts $e\ e$ on the outside, and valve D, having a central stem, $s$, all constructed substantially as set forth.

ANTON ZIMMERER.

Witnesses:
JAMES SWEET,
J. CHAS. DAVIS.